April 20, 1954     W. C. AUGENSTEIN     2,676,218
SELF-CANCELLING AUTOMOBILE DIRECTIONAL SIGNAL SWITCH
Filed May 10, 1951     2 Sheets-Sheet 1
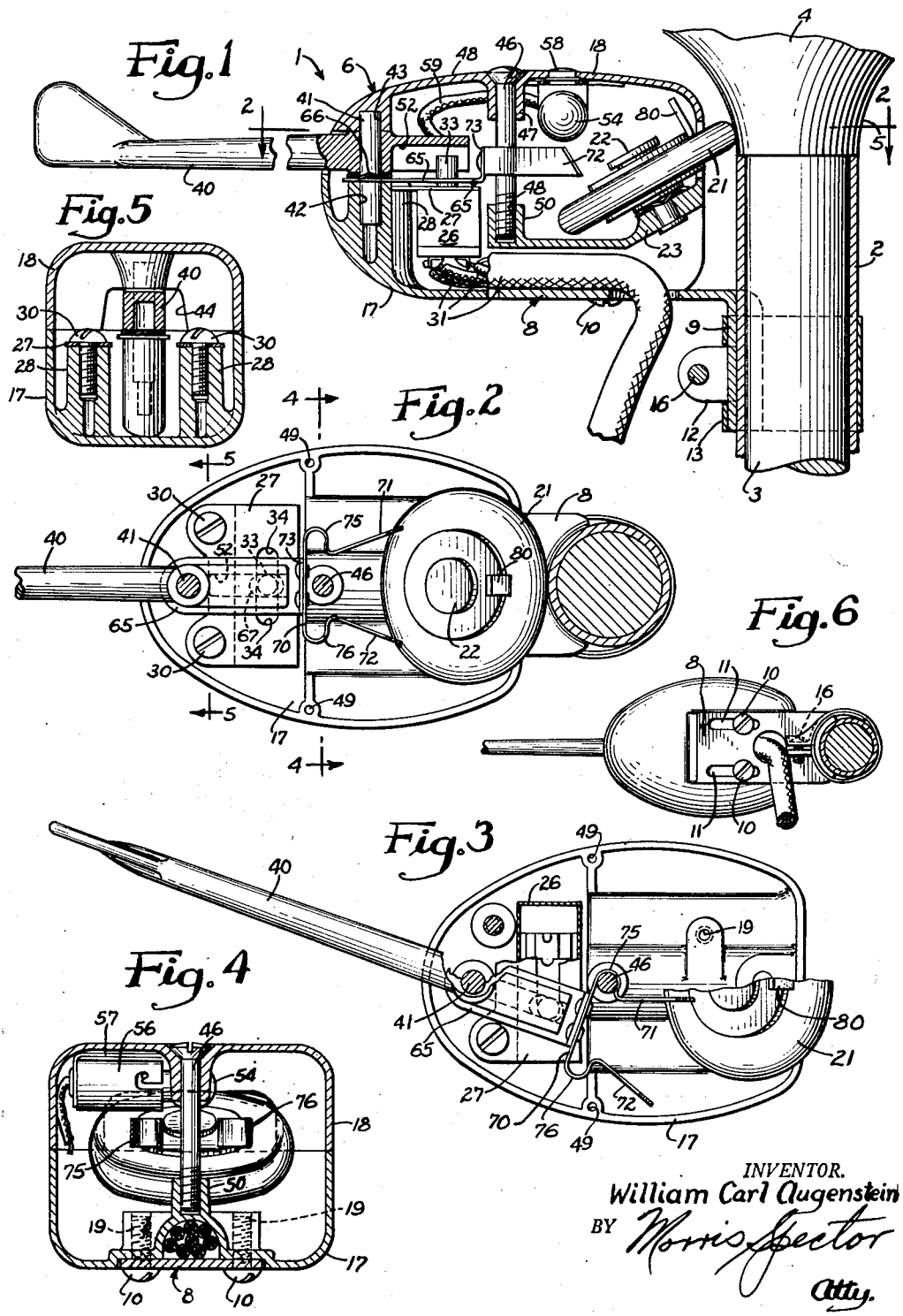
INVENTOR.
William Carl Augenstein
BY Morris Spector
Atty.

April 20, 1954   W. C. AUGENSTEIN   2,676,218
SELF-CANCELLING AUTOMOBILE DIRECTIONAL SIGNAL SWITCH
Filed May 10, 1951   2 Sheets-Sheet 2

INVENTOR.
William Carl Augenstein
BY Morris Spector
Atty.

UNITED STATES PATENT OFFICE 2,676,218

SELF-CANCELLING AUTOMOBILE DIRECTIONAL SIGNAL SWITCH

William Carl Augenstein, Chicago, Ill., assignor to Doray Lamp Co., Inc., Chicago, Ill., a corporation of Illinois Application May 10, 1951, Serial No. 225,564

10 Claims. (Cl. 200—61.36)

This invention relates to directional signal actuating devices for vehicles and more particularly to a switching device suitable for indicating contemplated change in the course of such a vehicle to the left or to the right of the straight ahead direction.

An object of the invention is to provide new and improved direction signalling devices.

A further object of the invention is to provide a unitary direction indicator control device which may be fastened to the housing of a steering column of any vehicle and which is returned to a neutral position, that is, a position not indicating any turn, automatically whenever the wheels of the vehicle are returned to straight ahead position from turning positions.

Another object of the invention is to provide a simple, compact direction indicator control unit having a minimum number of movable parts and wherein those elements which receive the most wear during normal use of the device are easily removable and replaceable.

In accordance with a preferred embodiment of the present invention there is provided a housing having a rotatable wheel mounted thereon, means for securing the housing to a non-rotatable portion of a steering assembly in such a position that the wheel is in engagement with element of the steering assembly rotatable when the vehicle is turned. A switch mounted in the housing having a selectively operable actuator is adapted to connect a signal light of the vehicle to an interrupter when the actuator is moved to one position and is adapted to connect a second signal light of the vehicle to the interrupter when actuated in the opposite direction. Means are provided for urging the switch to neutral position, and a yoke having a pair of socketed or latching leaf-springed arms is movable with the switch actuator. Each of the leaf-spring arms is designed to latch the switch in operated condition when the switch actuator is moved to a position indicating one direction or the other. As the steering wheel is turned in a direction such as to turn the vehicle from a straight ahead direction a lug carried by the switch wheel is moved past the leaf-spring arm, that is, in latching position, merely to press that spring arm more tightly with the pin. When the steering wheel is turned in the opposite direction to straighten its course after a turn, the lug engages the end of the latching spring arm to flex the arm and unlatch it, whereby the actuator-urging means urges the switch into neutral position.

In a switch of the above mentioned character, when the signal lever has been operated to indicate an intended turning of the vehicle, turning of the steering wheel in the direction of turning of the vehicle must not restore the switch but the reverse turning of the steering wheel must restore the switch. This means that so long as the steering wheel is being turned to effect turning of the vehicle the restoring lug repeatedly passes over the unlatching spring but does not cause unlatching. If the latching spring is of considerable tension this idle actuation of the latching spring during the initiation of the turning movement is objectionable from the point of view of force required and from the point of view of noise and wear. It is an object of the present invention to reduce these objections that occur during the initiation of the turning movement. This is accomplished in the present invention by making the latching spring of the necessary stiffness to accomplish the latching and unlatching operation, and making the stiff spring terminate short of engagement with the release lug. Attached to this stiff spring is a very light spring that extends into the path of the release lug, this light spring being so secured to the stiff spring that when the light spring is actuated in its idling direction it separates from the stiff spring, whereas when it is actuated in its active direction it bears against the stiff spring and actuates it.

It is a still further object of the present invention to provide a switch of the above mentioned character which is easy to assemble and to disassemble.

The attainment of the above and further objects of the present invention will be apparent from the following specification taken in conjunction with the accompanying drawing forming a part thereof.

In the drawing:

Figure 1 is a fragmentary, partially sectional view of a switching device forming one embodiment of the invention secured to a housing of a steering wheel;

Figure 2 is a fragmentary, horizontal section taken along the line 2—2 of Figure 1;

Figure 3 is a fragmentary, horizontal section similar to Figure 2 but with certain elements of the device in different positions from those in which they are shown in Figure 2 and with certain parts broken away;

Figure 4 is a vertical section taken along the line 4—4 of Figure 2;

Figure 5 is a sectional view taken along the line 5—5 of Figure 2;

Figure 6 is a reduced fragmentary bottom plan view of the apparatus;

Reference may now be had more particularly to the drawing wherein like reference numerals designate like parts throughout.

Figure 8:
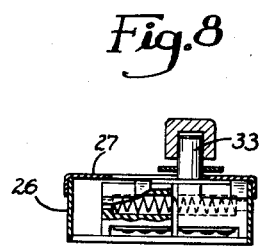
Figure 8 is a simplified sectional view of the contact actuator of the direction switch of the present invention.
Figure 7:
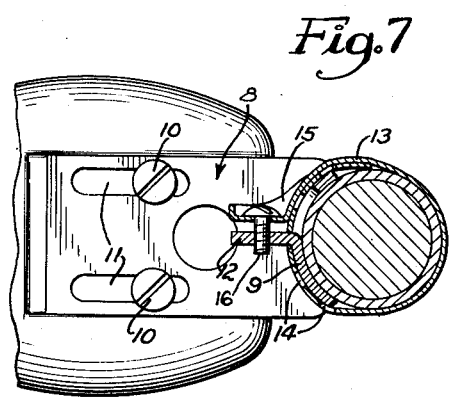
Figure 7 is an enlarged bottom view of the switch mounting strap in place.

The directional indicating switch of the present invention is indicated in general by the reference numeral 1, the switch being shown as secured to the outer stationary sleeve 2 of the steering column of a conventional automobile or automobile truck. The steering column houses a usual rotatable steering shaft 3 on which is mounted the usual automobile steering wheel 4 that is turned by the hands of the driver to control the course of the automobile. The steering wheel 4 has the usual hub 5. The switch 1 includes a two-piece housing 6 and an L-shaped mounting bracket 8 that extends from the base of the switch housing and has an arm 9 at right angles to the portion of the bracket secured to the switch housing, the bracket being mounted on the base of the switch housing by screws 10 that extend through elongated slots 11 in the bracket and are threaded into suitable bosses in the housing, as will more fully appear as this description proceeds. The slots 11 permit adjustment of the switch housing with respect to the bracket. The arm 9 of the bracket is curved to extend along the curve of the sleeve 2, as may be seen from Figure 7. The arm 9 has an ear 12 integral therewith and projecting at right angles therefrom. The bracket is secured to the steering column sleeve 2 by a flexible metal strap 13. The strap 13 has a series of spaced rectangular slots 14 at one end thereof and an ear 15 at the opposite end. One of the slots 14 is slipped over the ear 12, and the strap is then wound around the steering column sleeve 2, the particular slot 14 chosen being the one that will bring the ear 15 almost but not quite up to the ear 12. A screw 16 is then passed through a hole in the ear 15 and threaded into a threaded hole in the ear 12 to draw the ears 12—15 towards one another and thereby to tighten the strap around the sleeve 2 of the steering column and thereby to secure the bracket to the sleeve in the position in which it has been placed.

The switch housing 6 includes a lower half housing 17 and an upper half housing 18 that serves as a closure for the lower half housing. Sockets 19 are formed in a boss on the lower housing 17 into which the screws 10 are threaded to secure the housing and the bracket 8 together. A rubber tired wheel 21 is mounted rotatably on a flanged rivet 22 which is mounted on a wall portion 23 of the lower housing 17 and constituting an axle for the wheel 21. The wheel 21 is held in frictional engagement with the hub 5 of the automobile steering wheel 4 and is turned thereby as the steering wheel 4 is turned. In the assembly of the directional switch of Figure 1 onto a vehicle the two screws 10 are loosened to permit free sliding of the bracket with respect to the switch housing assembly, the bracket is then strapped to the steering column 2 of the automobile, the switch housing assembly is then moved toward the steering wheel to force the rubber tired wheel 21 into driven engagement with the hub 5, and the screws 10 are then tightened to maintain this engagement.

A conventional signal light controlling switch 26 having a cover plate 27 secured thereto is mounted in the lower housing 17 by means of the plate 27 which rests on bosses 28 formed integrally with the lower housing and is secured to the bosses by screws 30—30 (Figs. 2 and 5). A cable 31 extends into the switch housing 17 through an enlarged hole in the bracket 8 and through an opening in the lower switch housing. The switch 26 is connected by the conductors of the cable 31 to the tail lights of the automobile through a circuit interrupter of the flasher type (not shown), as is conventional. The switch has a switch actuating pin 33 which projects through a slot 34 in the plate and is maintained centered by the centering spring 35. The pin is movable in the slot to the right or to the left of its centered position to control each of the two contact carrying insulator blocks 36—37 that complete circuits that control the right and left tail lights of the automobile over the conventional circuits. The blocks are slidable in the casing and are spread apart by the spring 35. The pin 33, through a slide plate 38 to which it is connected can move either block 36 or 37 towards the other block. When the actuating pin 33 is moved upwardly (as seen in Fig. 2) the right parking light of the vehicle is connected to the interrupter. When the pin 33 is moved from its neutral position downwardly, as viewed in Fig. 2, the switch 26 connects the left tail light and the left parking light to the interrupter to indicate a left turn of the vehicle.

A manually operable switching arm 40 is mounted pivotally on a pin 41 held in aligned opposed sockets 42 and 43 formed in the two housing halves, respectively, and extends through an overwide opening 44 in the upper housing half 18. The two housing halves are secured by a single screw 46 projecting through a boss 47 having a tapered socket, and threaded into a tapped bore formed in a boss 50 of the lower housing half 17. The pin 41 keys the upper housing 18 to the lower housing 17 to prevent rotation therebetween about the screw 46, and pins 49 projecting upwardly from the lower housing aid in locating the upper housing on the lower housing.

The arm 40 has a slot 52 formed therein designed to permit the pin 33 of the switch 26 to slide relative to the lever 40 when the lever 40 is pivoted on the pin 41.

An indicating lamp 54 is mounted in a socket 56 secured to the upper housing 18 by a bracket 57 under an opening closed by a lens 58 in the housing. When the pin 33 of the switch 26 is moved either to the left or the right, that is, to its uppermost position or its lowermost position from its position shown in Fig. 2, the lamp 54 is lighted to indicate to a driver of a vehicle that the switch 26 is in an actuated condition. A conductor 59 connects the lamp 54 to the switch 26.

An L-shaped bracket 65 is mounted pivotally on the pin 41 but not keyed thereto, and is separated from the lever 40 by a corrugated washer 66. The bracket 65 has an elongated slot 67 therein through which the actuating pin 33 of the switch 26 projects. The slot 67 permits the bracket 65 to turn about the pin 41 without binding with the pin 33, which moves the bracket 65 with the slotted end of the lever 40. A leaf spring 70 having arms 71 and 72 is riveted to an upstanding arm 73 of the bracket 65. The arms 71 and 72 are provided with arcuate latching portions 75 and 76, respectively, at the bases thereof, which arcuate portions extend through arcs somewhat over 180 degrees to form locking detents or sockets. The arcuate portions 75 and 76 each face the screw 46. When the lever 40 is moved from the position in which it is shown in Fig. 2 to the position in which it is shown in Fig. 3, the latching portion 75 snaps over the screw 46 to hold the actuating pin 33 and the lever 40 in the positions in which they are shown in Fig. 3 against the action of the return or centering spring 35 of the switch 26. Conversely, when the lever 40 is swung in a counter-clockwise direction from the position thereof shown in Fig. 2 to move the pin 33 to its upper switch-actuating position, the arcuate latching portion 76 snaps over the pin 46 to hold the pin 33 and the lever 40 in the positions they then occupy.

With the elements of the switching device in the positions in which they are shown in Fig. 3, when the steering wheel 20 is rotated in such direction as to rotate the wheel 21 in a counter-clockwise direction, as viewed in Fig. 3, an upstanding lug 80 carried eccentrically on the wheel 21 is revolved past the arm 71. As the lug is so revolved, it engages the end of the arm 71 and flexes the arm out of its path without loosening the latching action of the arcuate latching portion 75. However, when the steering wheel is turned so as to turn the wheel 21 in a clockwise direction, the lug 80 catches the end of the arm 71 and flexes the arm 71 in a direction such that the arcuate latching portion 75 is opened and the arcuate latching portion 75 is pushed off the screw 46 by the combined action of the lug 80 and the spring-pressed actuating pin 33. The pin 33 then pushes the bracket 65 and the lever 40 back to neutral positions, in which positions the ends of the arms 71 and 72 are out of the path of the lug 80. The free ends of the arms 71 and 72 are cut so as to be parallel to the lug 80 when the arm is in positions latched to the screw 46. Hence, scoring of the lug 80 is prevented.

*Operation*

When it is planned to turn the vehicle to the left, the lever 40 is moved by the operator in a counter-clockwise direction as viewed in Fig. 2, to move the actuating pin 33 to a position connecting the left tail and parking lights of the vehicle to the interrupter and the arcuate latching portion 76 is snapped over the screw 46 to hold the pin 33 in this position. Then the operator makes the left turn by turning the steering wheel in a counter-clockwise direction. This turns the wheel 21 in a clockwise direction, and the lug 80 moves past the end of the leaf spring arm 72 and merely flexes the arm 72 as it passes that arm without disturbing the latching function of the latching portion 76. The operator, after making the left turn revolves the steering wheel 20 in a clockwise direction, which turns the wheel 21 and the lug 80 in a counter-clockwise direction. As the lug 80 engages the arm 72 it flexes it in the direction opening the latching portion 76 to release the latching portion 76 from the screw 46, and the spring-pressed actuating pin 33 moves the lever 40, the bracket 65 and the spring 70 back to neutral positions and the switch 26 disconnects the left tail and parking lights from the flasher and extinguishes the lamp 54.

When it is desired to make a right turn the operator swings the lever 40 in a counter-clockwise direction, as viewed in Fig. 2, to move the pin 33 and the spring 70 to the positions thereof shown in Fig. 3 with the arcuate latching portion 75 of the spring arm 71 snapped over the screw 46. When the pin 33 is in this position the switch 26 is actuated to light the lamp 54 and to connect the right tail and parking lights to the interrupter and to light the indicator lamp 54. Then, as the operator turns the steering wheel in a clockwise direction, as viewed in Fig. 2, the wheel 21 and the lug 80 are revolved in counter-clockwise directions and the lug 80 merely flexes the spring arm 71 out of its path. After the right turn has been made, the operator turns the steering wheel in a counter-clockwise direction to straighten the course of the vehicle and the wheel 21 and the lug 80 are revolved in a clockwise direction. This moves the lug into engagement with the spring arm 71 and flexes the arcuate latching portion 75 to releasing position. The spring 70, the bracket 65, the lever 40 and the actuating pin 33 are returned to neutral positions. This occurs during the first revolution of the lug 80.

The switch of the present invention may be easily and quickly secured to conventional steering columns of automobiles. The strap arrangement for securing the switch to the steering column is simple and convenient and is usable on steering columns of a very wide range of diameters and permits shifting of the switch to almost any position on the steering column. It also permits shifting of the switch housings on the bracket 8 towards and from the steering column, as may be necessary by reason of the differences of sizes of the hubs 5 of steering columns for different makes of automobiles. If necessary or desired the bracket 8 may be secured to the housing 17 in a position turned 180° from that shown in Figure 1 so that the arm 9 of the bracket extends upwardly from the base of the switch instead of downwardly. This may be necessary in structures where there is limited space below the bottom of the hub 5.

It is also apparent from the above description that the rotating wheel 20 always clears the spring arms 71 and 72 when the lever 40 is in its central or neutral position. This reduces wear on the moving parts.

Figure 10:
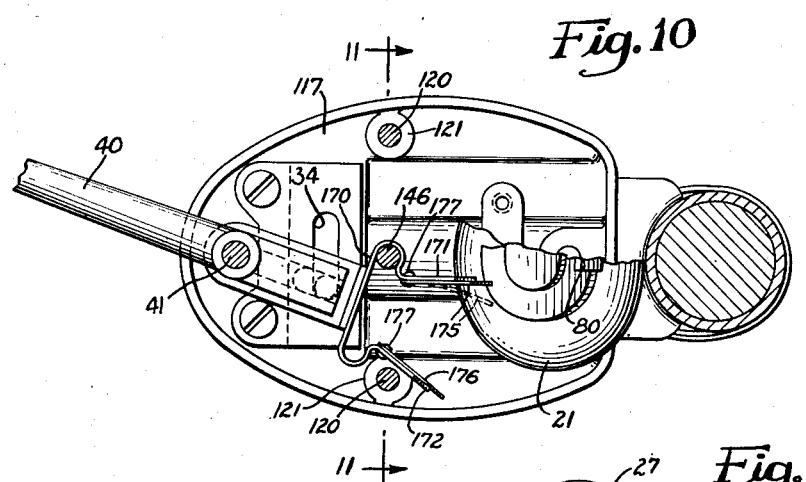
Figure 10 is a view similar to Figure 2 and showing an alternate construction.

Reference may now be had more particularly to Figure 10 which shows a modified construction. In this construction the leaf spring 170 that corresponds to the spring 70 of Figure 1 is of substantially the same construction as that spring except that the arms 171 and 172 of the spring 170 are made slightly shorter than the corresponding arms 71—72 of the switch previously described, so that the arms 171 and 172 are always just short of the lug 80 when they are in their respective positions closest to the orbit of the lug 80. Secured to the spring arm 171 is a leaf spring 175, a similar leaf spring 176 being secured to the arm 172. These leaf springs are secured to the respective arms by rivets 177 close to the latching portions of those arms. The leaf springs lie on the inner faces of the respective leaf spring arms 171 and 172 and project slightly beyond those arms so as to bring the outermost end of the leaf spring 175 or 176, as the case may be, into the path of the lug 80 when the arm 40 has been moved to one or the other of its ultimate signaling positions. Thus, when the leaf arm 50 has been moved to the position illustrated in Figure 10 the leaf spring 175 is in the orbit of the release lug 80. If the wheel 21 is turning to turn the release lug 80 in a counter-clockwise direction, it will, during each revolution, engage the light spring 175 and flex it from the full line position of Figure 10 to the dotted line position of Figure 10. This requires very little force and produces very little noise and very little wear, since, as stated above, the leaf spring 175 is a very light spring. This action is repeated during each revolution of the wheel 21 in a counter-clockwise direction, which is assumed to be the direction it will turn when the steering wheel is turned to initiate the desired turning of the automobile, indicated by the position of the lever arm 40. Upon reverse rotation of the wheel 21, which takes place on initiation of the straightening of the steering wheel, the lug 80 will engage the leaf spring 175 and force it against the spring arm 171 and thus move the spring arm 171 to its restoring position, the same as previously described. Since the leaf spring projects beyond the arm 171 only a small amount, the arm 171 constitutes a backing for the leaf spring 175 when the leaf spring is flexed in its restoring position, but does not constitute a backing for the leaf spring when the leaf spring is flexed in the opposite direction.

Figures 9, 11:
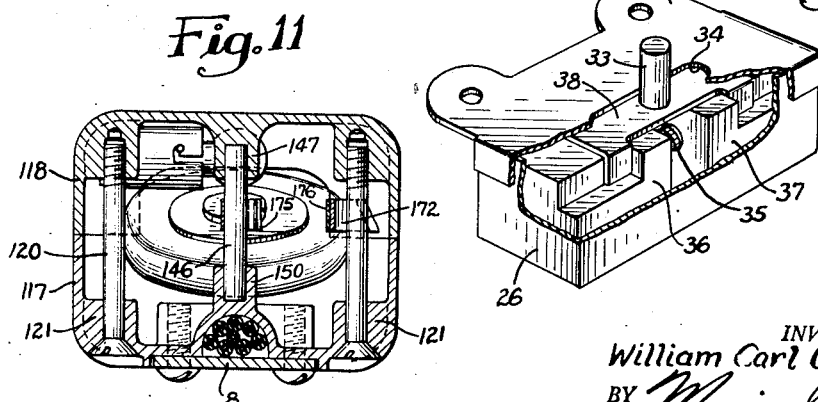
Figure 9 is a broken apart perspective view of the direction contact making mechanism of the switch of Figure 1.
Figure 11 is a sectional view taken along the line 11—11 of Figure 10 and looking in the direction of the arrows, said view being taken with the switch actuating lever in its neutral position.

The embodiment illustrated in Figure 10 involves an additional change from that of Figure 2. This additional change consists essentially in that the screw 46 of Figure 1 has been replaced by a dowel pin 146 that seats in a boss 150, corresponding to the boss 50 of Figure 4, in the lower housing half 117 and at its upper end extends into a bore in a boss 147 in the upper housing half, said boss 147 corresponding to the boss 47 of Figure 1 except that the bore in the boss 147 does not extend through that boss. The dowel pin 146 performs the latching function of the screw 46 of the embodiment previously described. The lower housing half 117 and the upper housing half 118 are secured together by a pair of screws 120 that extend through bosses 121—121 molded integral with the lower housing half and thread into tapped bores in corresponding bosses in the upper housing half, as illustrated in Figure 11. By this arrangement the screws for securing the two housing halves together have their heads on the lower, unexposed, side of the switch so that the upper side of the switch need not have a hole as is required for the screw 46 of Figure 1. The indicating light 54 of Figure 1 may be provided in the embodiment of Figures 10 and 11, the same as in Figure 1, or may, optionally, be omitted.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. A directional signal actuating device comprising a switch having an element movable from a non-operating position to a direction signal operating position, manually operable means for moving said switch element to said operating position, means normally urging the switch element to said non-operating position, a leaf spring arm having an arcuate latching portion movable with the switch element-moving means, a pin so positioned that the arcuate latching portion of the arm snaps over it and latches the switch element in said operating position, means movable in one direction by movement of a vehicle steering element in one direction into momentary engagement with the arm so that the arm is flexed in a direction to tighten the latching portion on the pin and movable in a direction opposite to the first mentioned movement thereof by reverse movement of the steering element for flexing the spring arm in the direction to release the arcuate latching portion from the pin.

2. A directional signal actuating device for an automobile, which comprises switching means for actuating a directional signal, manually operable means for actuating the switching means from a non-signalling position to a signalling position, means normally urging the switching means to the non-signalling position, a lug revolvable in one direction by movement of a steering element in one direction and revolvable in a direction opposite to the first-mentioned direction of revolution by movement of the steering element in a reverse direction, a stationary pin, a leaf spring arm having an arcuate latching portion movable with the switch-actuating means from a retracted position out of the path of the lug to a projected position in the path of the lug in which the arcuate latching portion snaps over the pin to latch the switch in signalling position, the lug flexing the arm so as to tighten the latching portion on the pin when the lug is moved in the first-mentioned direction and flexing the spring arm so as to release the arcuate latching portion from the pin when the lug is moved in the opposite direction.

3. A directional signal actuating device comprising a pair of separable complementary housing portions having aligned sockets therein at one end of each and aligned bores spaced from the sockets, an actuating lever projecting into said ends of the housing portions, a pin in the sockets of the housing portions and mounting the actuating lever pivotally on the housing portions, a second pin extending into said bores in the housing portions, one of said housing portions having a shoulder formed thereon, a directional switch mounted on the shoulder formed on said housing portion and having an actuating projection movable by the lever, a bracket mounted pivotally on the first pin mounting the lever and pivotable by movement of the actuating arm of the switch, a pair of latching leaf spring arms carried by the bracket having arcuate latching portions facing the second pin, each latching portion being movable to a position snapped onto the second pin, a wheel designed to peripherally engage a steering element of a vehicle and movable by turning of the steering element, and a lug carried by the wheel for engaging either one of the arms that is snapped onto the second pin to flex the arcuate latching portion thereof sufficiently to release it from the second pin when the steering element is moved in a direction tending to straighten the course of the vehicle.

4. A directional signal actuating device comprising a pair of separable complementary housing portions having aligned sockets therein at one end of each and aligned bores spaced from the sockets, an actuating lever projecting into said ends of the housing portions, a pin in the sockets of the housing portions and mounting the actuating lever pivotally on the housing portions, means comprising a screw extending into said bores in the housing portions and securing the housing portions together, one of said housing portions having a shoulder formed thereon, a directional switch mounted on the shoulder formed on said housing portion and having an actuating projection movable by the lever, a bracket mounted pivotally on the pin mounting the lever and pivotable by movement of the actuating projection of the switch, a pair of latching leaf spring arms carried by the bracket and having arcuate latching portions facing the screw, each latching portion being movable to a position snapped onto the screw, a wheel designed to peripherally engage a steering element of a vehicle and movable by turning of the steering element, and a lug carried by the wheel for engaging either one of the arms that is snapped onto the screw to flex the arcuate latching portion thereof sufficiently to release it from the screw when the steering element is moved in a direction tending to straighten the course of the vehicle.

5. A directional signal actuator which comprises a housing, an actuating lever mounted pivotally on the housing, a double-throw directional switch mounted in the housing provided with an actuating element operable by one end of the lever, a pin mounted in the housing, a pair of leaf spring arms having arcuate latching portions facing the pin and selectively movable by the actuating element into positions snapped over the pin, means movable in one direction by the turning of a vehicle steering element in one direction along a path such as to merely flex one of the arms snapped over the pin and movable in the opposite direction along the path by opposite turning of the steering element to flex the arcuate latching portion of the arm sufficiently to release the arm from the pin.

6. A directional signal actuator, which comprises switching means having actuating means normally urged to neutral position movable in one direction to one operating position and movable in the opposite direction to a second operating position, manually operable means for moving said actuating means selectively to said operating positions, a latching pin mounted in a fixed position relative to said switch, a pair of leaf springs arms having arcuate latching portions designed to snap over the pin to latch the arms to the pin, means movable with the actuating means mounting the springs in positions bracketing the pin and movable in accordance with movement of the actuating means for selectively moving the leaf spring arms into latching engagement with the pin, a rotatable wheel designed to engage a steering element of a vehicle and be turned by the turning movement of the steering element, a lug projecting from the disc and carried therewith, said lug and said leaf spring arms being in such positions relative to one another that the lug clears the ends of the arms when the switch actuating means is in neutral position and engages one of the arms when that arm is in latching engagement with the pin for flexing the arm in such a manner when moved in one direction past the end of the arm as to tighten the latching portion on the pin and for engaging the end of the arm to release the arcuate latching portion of that arm from the pin when moved in the opposite direction.

7. A directional signal actuator, which comprises switching means having an actuator normally urged to neutral position and movable in one direction to one switch-operating position and in the opposite direction to a second switch-operating position, manually operable means for moving said actuator selectively to said switch-operating positions, a pin mounted in a fixed position relative to said switch, a pair of leaf spring arms having arcuate latching portions designed to snap over the pin to latch the arms to the pin, means movable with the actuator mounting the springs in positions bracketing the pin for selectively moving the leaf spring arms into latching engagement with the pin, means designed to engage a steering element of a vehicle and be moved by the turning movement of the steering element in accordance with the direction of turning of the steering element along a path not intersecting the ends of the arms when the switch actuator is in neutral position and intersecting the latched one of the arms when that arm is in latching engagement with the pin for flexing that arm in such a manner when moved in one direction past the end of that arm as to tighten the latching portion on the pin, and for engaging the end of that arm to release the arcuate latching portion of that arm from the pin when moved in the opposite direction.

8. A directional signal actuating device for a vehicle comprising a switch having an element movable from a non-operating position to a direction signal operating position, a manually operable lever for moving said switch element to said operating position, an arm movable with said lever, a stationary pin located in the path of movement of said arm to stop the movement thereof when said switch element is in the direction signal operating position, a wheel located for peripheral engagement with the steering element of a vehicle and movable by the turning of the steering element and means on said wheel movable therewith upon the movement of the vehicle steering element in a direction tending to straighten the path of motion thereof after having turned as indicated in a direction to abut and move said arm away from said pin and into a position where said lever and switch elements are in said non-operating position.

9. A directional signal actuating device for a vehicle comprising a switch having an element movable from a non-operating position to a direction signal operating position, a manually operable lever for moving said switch element to said operating position, a stationary pin located in the path of motion of a portion of said lever to limit the movement thereof to a position where said switch element is in said signal operating position, a wheel located for peripheral engagement with the steering element of a vehicle and movable by the turning of the steering element, a lug on said wheel and movable therewith in one direction by any movement of the vehicle steering element in a direction to turn the vehicle and movable in a direction opposite to the first-mentioned direction by any movement of the vehicle steering element in a direction to straighten the vehicle after turning, said lug positioned to move said lever away from said stationary pin and into the non-operating position when said lever is in the signal operating position and said lug is moved in said opposite direction, said lever being immovable by movement of said lug when the lever is in a non-operating position.

10. A directional signal actuating device for a vehicle comprising a three-position switching means for actuating a direction signal indicator which is to indicate a right or left turn, the center position of said switch means for indicating no turn, and the extreme positions of said switch means for indicating right and left turns respectively, a lever pivoted about a generally vertical axis, which is to be displaced from the axis of rotation of the vehicle steering element with which it is to be associated, and connected to said switch means for moving same into said switch positions, switch release means movable with the steering element of a vehicle in a direction depending on the direction of rotation of the vehicle steering element, and in a plane having a component at right angles to said lever pivot axis, an abutment located between said lever pivot axis and the path of movement of said switch release means, a pair of arm members extending on opposite sides of said abutment and connected for movement with said lever about the pivot axis thereof and adapted to be locked by said abutment and lock said lever and switch from further motion when said lever has positioned said switch means respectively to said extreme positions, one of said arms having an extension which is adapted to extend into the path of motion of said switch release means only when said lever has been pivoted to one of its extreme positions, thereby being urged toward said abutment by said switch release means in one direction of rotation of the vehicle steering element, and being urged away from said abutment when the vehicle steering element is rotated in the opposite direction to move said lever and switch means into its no-turn central position, the other of said arms having an extension which is adapted to extend into the path of motion of said switch release means only when said lever has been pivoted to its other extreme position, thereby being urged toward said abutment by said switch release means when the vehicle steering element is rotated in said last mentioned direction and being urged away from said abutment when the vehicle steering wheel is rotated in the opposite direction to move the lever and switch means into its no-turn central position.

References Cited in the file of this patent

UNITED STATES PATENTS

| Number | Name | Date |
|---|---|---|
| 1,465,596 | Collins | Aug. 21, 1923 |
| 2,362,689 | Eshbaugh | Nov. 14, 1944 |
| 2,427,595 | Fuller | Sept. 16, 1947 |
| 2,596,858 | Lapidus | May 13, 1952 |
| 2,597,078 | Drury et al. | May 20, 1952 |